United States Patent [19]

Kuribayashi

[11] Patent Number: 4,758,819

[45] Date of Patent: Jul. 19, 1988

[54] KEYSENSOR

[75] Inventor: Yukio Kuribayashi, Soka, Japan

[73] Assignee: Aica Kogyo Co., Ltd., Aichi, Japan

[21] Appl. No.: 827,064

[22] Filed: Feb. 7, 1986

[30] Foreign Application Priority Data

Jun. 6, 1985 [JP] Japan ............................... 60-123097

[51] Int. Cl.[4] ............................................. G01D 5/12

[52] U.S. Cl. ............................. 340/286 R; 200/61.66; 340/568; 340/825.31

[58] Field of Search ................... 340/568, 550, 825.31, 340/825.34, 311.1, 301, 332, 286 R, 825.3, 825.44, 825.49, 825.36, 825.76; 200/61.64, 61.66, 61.59, 61.19; 70/460; 235/130 R, 91 M

[56] References Cited

U.S. PATENT DOCUMENTS

| | | | |
|---|---|---|---|
| 2,589,349 | 3/1952 | Diefenbach . | |
| 3,007,568 | 11/1961 | Kurland . | |
| 3,228,020 | 1/1966 | Gassenheimer et al. | 340/313 |
| 3,258,763 | 6/1966 | Klein | 340/286 R |
| 3,465,131 | 9/1969 | Ten Eyck | 340/825.34 |
| 3,588,868 | 6/1971 | Head | 340/286 R |
| 3,673,389 | 6/1972 | Kapsambelis et al. | 340/825.3 |
| 3,797,009 | 3/1974 | Crudgington, Jr. | 340/332 |
| 3,906,447 | 9/1975 | Crafton | 340/825.31 |
| 4,060,123 | 11/1977 | Hoffman et al. . | |
| 4,081,022 | 3/1978 | Wester . | |
| 4,091,866 | 5/1978 | Curatolo . | |
| 4,101,886 | 7/1978 | Grimes et al. . | |
| 4,150,350 | 4/1979 | Fong . | |
| 4,174,064 | 11/1979 | Pratt, Jr. . | |
| 4,205,328 | 5/1980 | Gotanda | 340/568 |
| 4,213,110 | 7/1980 | Holce . | |
| 4,274,080 | 6/1981 | Brunken | 340/825.31 |
| 4,293,026 | 10/1981 | Day . | |
| 4,485,864 | 12/1984 | Carrell et al. . | |
| 4,505,426 | 3/1985 | Rossi et al. . | |
| 4,614,862 | 9/1986 | Fisermann | 340/825.31 |

FOREIGN PATENT DOCUMENTS

| | | |
|---|---|---|
| 925841 | 5/1963 | United Kingdom . |
| 2082352A | 3/1982 | United Kingdom . |
| 2103843A | 2/1983 | United Kingdom . |

*Primary Examiner*—Joseph A. Orsino
*Assistant Examiner*—Brent Swarthout
*Attorney, Agent, or Firm*—Finnegan, Henderson, Farabow, Garrett & Dunner

[57] ABSTRACT

A keysensor of the present invention is provided with a magnet and a magnetic switch opposedly via a hole for inserting and removing each keyholder containing magnetic metal sheet and consisting of non-magnetic substance, a plurality of magnetic switches are placed at predetermined places, said keysensor makes it possible for said magnetic switches to operate corresponding to said places by using said keyholder containing magnetic metal sheet different in each position and size.

4 Claims, 3 Drawing Sheets

KEYSENSOR

BACKGROUND OF THE INVENTION

1. Field of the Invention

The present invention relates to a keysensor having an insertion hole for a keyholder.

2. Description of the Related Art

Keysensors having an insertion hole for a keyholder have been conventionally used at places like hotels, etc. The signals showing "Occupied" when the plate-shaped keyholder is inserted in the hole of the keysensor, or "vacant" when the keyholder is removed from the hole, are generated and sent to a display unit at a front desk of a hotel, etc. People at the front desk, then know whether each customer is in the room or not, and may selectively turn on or off the switch to the room.

The conventional keysensors are designed only for the above-mentioned use, thus, they have a single switch which senses whether the keyholder is inserted or not. Specifically, a metal sheet, such as iron, is contained by the keyholder and a magnet and a reed switch are oppositely placed across an insertion hole in the keysensor. The reed switch is closed when the keyholder is removed, and is opened when the keyholder is inserted. In the configuration mentioned above, the position of the switch remains unchanged if the same keyholder is reversely inserted.

At places like hotels, etc., employees usually clean the room and check the facilities after the room is vacated. Attendants at the front desk need to know whether a room is being cleaned or has been cleaned or the room is occupied or vacated, and so far they relied on the telephone only.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

It is an objective of the present invention to let people at the front desk automatically ascertain the status of each guest room, without having to use the telephone, by modifying a keyholder and keysensor. The present invention selectively activates magnetic switches to transmit different output signals in accordance with types of keyholders and their orientation in the keyholder by providing a plurality of magnetic switches (e.g., reed switch) inside the keysensor and arranging them at predetermined places.

If the shape and size of iron metal sheets contained within the keyholder are changed so as to comply with specified positions of the magnetic switches inside the keysensor, only the magnetic switch at the specified position will be activated when a selected keyholder is inserted in a selected orientation. Thus, the operation of plural magnetic switches going on or off is varied and it is possible to generate various kinds of information signals by combining it.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Reference will now be made in detail to the present preferred embodiment of the invention as illustrated in the accompanying drawings.

Figure 1A:
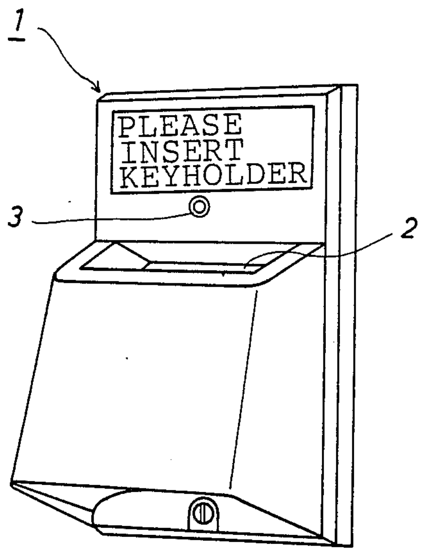
FIG. 1A is a perspective view of a keysensor in accordance with a present preferred embodiment of the present invention.

In FIG. 1A, a keysensor, generally referred as 1, has an insertion hole 2 for a keyholder and an LED pilot lamp 3. The LED pilot lamp (3) is for marking and insertion hole 2 for guiding the keyholder 3 into the hole 2. Lamp 3 will go off when the keyholder is inserted.

Figure 1B:
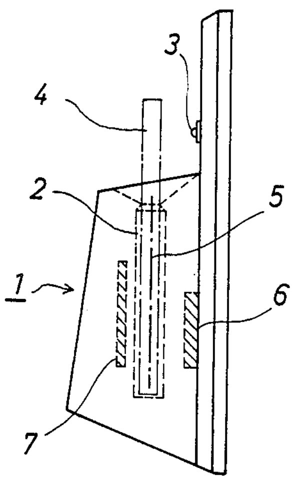
FIG. 1B is a side view showing the interior of the keysensor of FIG. 1 with a keyholder inserted therein.
Figure 1C:
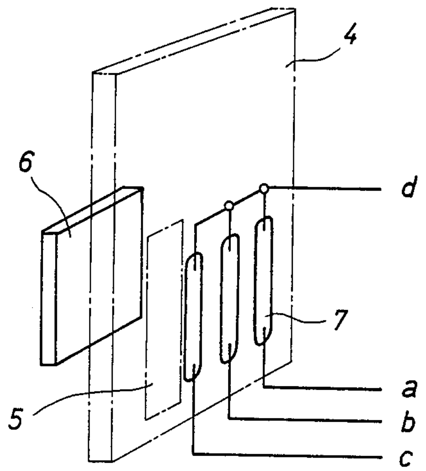
FIG. 1C is a perspective view of the keyholder, interior of FIG. 2 illustrating a keyholder in phantom between the magnet and reed switches.

In FIG. 1B, a keyholder 4 is shown in alternate long and short dashed lines and is inserted in the insertion hole (2). A magnetic metal sheet 5, such as iron, is contained by the keyholder (4) which consists of a non-magnetic substance such as plastic. A magnet 6 is placed on one side in the keysensor (1) in relation to the insertion hole (2), and a magnetic switch 7, such as a reed switch of the insertion hole 2 opposite magnet 6. A plurality of reed switches are placed on a supporting plate (not shown) and positioned at predetermined locations as shown in FIG. 1C. In the figure, three reed switches are placed in parallel. Each terminal of a respective switch is designated by a, b, and c and the common terminal d of each switch.

FIG. 2 is an example of the keyholder 4 used for the keysensor (1) in FIG. 1. FIG. 2A is a front view of the keyholder which customers would use, and FIG. 2B is a backview of the keyholder of FIG. 2A. FIG. 2C is a front view of a keyholder which employees would use, and FIG. 2D is a back view of the keyholder of FIG. 2C.

Figure 2A:
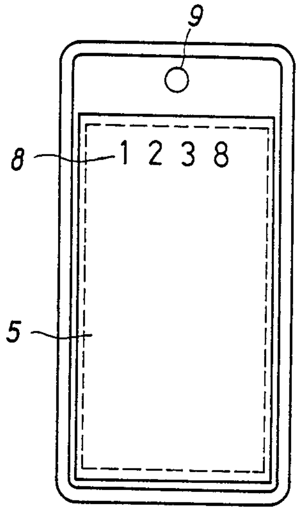
FIG. 2A is a front view of a keyholder incorporating the teachings of the instant invention.
Figure 2B:
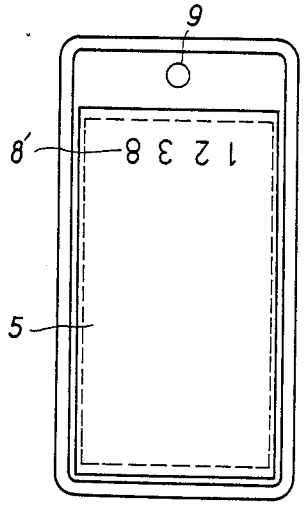
FIG. 2B is a back view of the keyholder shown in FIG. 2A.
Figure 2C:
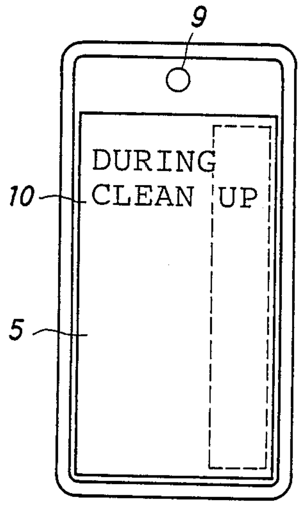
FIG. 2C is a front view of a second embodiment of a keyholder incorporating the teachings of the instant invention.
Figure 2D:
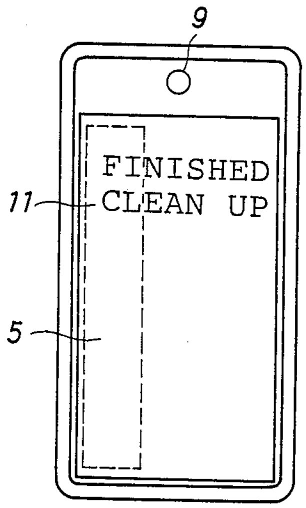
FIG. 2D is a back view of the keyholder shown in FIG. 2C.

In FIG. 2A, a room number 8 (specified example: Room No. 1238) is shown on the keyholder and an installation hole 9 for a key (not shown) is provided. In FIG. 2B, (8') is a room number reversely shown when the keyholder is inserted in a second orientation. The keyholder for customers shown in FIGS. 2A and B contains the iron sheet (5). In FIGS. 2C and D, numerals (10) and (11) are indications showing the condition of the room respectively (specified examples: "during clean up" and "finished clean up"). In the keyholder for employees shown in FIGS. 2C and 2D, the iron sheet (5) is contained on the right side of the keyholder when the keyholder is in a first orientation, and the iron sheet 5 is on the left side of the keyholder, as shown in FIG. 2D, if the keyholder is turned over and positioned in a second orientation.

FIG. 3 is an explanatory drawing showing the operating conditions of the magnetic switches indicating "occupied", "during clean up", "finished clean up", "during checking" and "finished checking" respectively. Though the position of the magnet (6) and the magnetic switches (7) in FIG. 3 are opposite to that in FIG. 1B, there are no differences in operation.

Figure 3A:
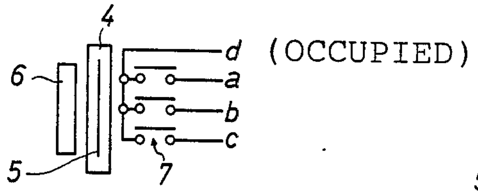
FIGS. 3A through 3E schematically illustrate the various operating conditions of the reed switches and positions of the keyholder in accordance with a present preferred embodiment of the invention.
Figure 3B:
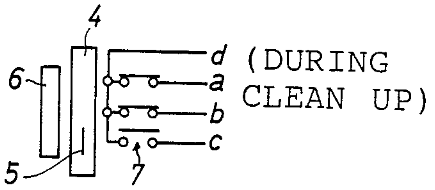

FIG. 3A shows the condition when the keyholder 4 for customers, shown in FIGS. 2A and B, is inserted into the keysensor (1). When the keyholder for customers is inserted in either the first or second orientation, all the reed switches will go off because of the iron sheet (5). When the keyholder (4) is removed the reed switches are on. "Vacant" is indicated if terminals a, b and c are on and "occupied" is indicated vice versa. FIG. 3B shows the condition of the reed switches when the keyholder for employees (4) in FIGS. 2C and D is obversely inserted and only the reed switch connecting to terminal c goes off because of the iron sheet (5) on the right side of the keyholder.

Figure 3C:
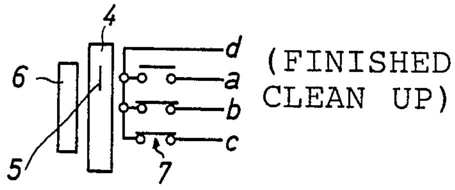

FIG. 3C shows the condition when the same keyholder (4) is reversely inserted and only the reed switch connecting to terminal a goes off as the iron sheet (5) is on the left side of the keyholder. Thus, the condition when only the terminal c is off shows "during clean up" and the condition when only the terminal a is off shows "finished clean up".

Figure 3D:
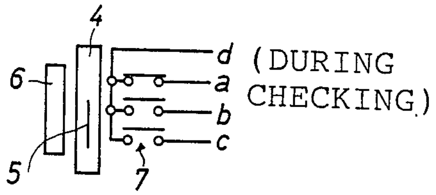

In FIG. 3D, the reed switches connecting to the terminals b and c go off when the keyholder for employees (4), in which the iron sheet (5) is placed over two reed switches, is inserted.

Figure 3E:
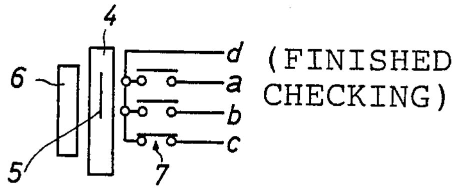

FIG. 3E shows the condition when the same keyholder (4) is reversely inserted in the second orientation and the lead switches connecting to terminals a and b go off. So "during checking" is indicated when terminals b and c are off and "finished checking" is indicated when terminals a and b are off.

The relation between the indicated items and on and off conditions of each terminal mentioned above is shown as follows.

| Room Condition | Terminal a | b | c |
|---|---|---|---|
| Vacant | on | on | on |
| Occupied | off | off | off |
| During Clean up | on | on | off |
| Finished Clean up | off | on | on |
| During Checking | on | off | off |
| Finished checking | off | off | on |

The code signals which consist of on and off as shown above are decoded by a decoder so as to form indication signals showing the condition of each room. People at the front desk of a hotel can grasp it immediately after receiving these indication signals. Also, a computer display system can be employed in this case.

Though three magnetic switches are placed in parallel in the above embodiment, it is possible to indicate more items by providing more magnetic switches and selecting the position and the size of the iron sheeet in the keyholder in accordance with the positions of the switches. Also, it is possible to employ the keysensor of the present invention transiently for indicating just "vacant" and "occupied" as in conventional use.

As clear from the explanation above, the present invention makes it possible to send various kinds of information signals on the condition of the rooms. The central display unit receives the signals so as to indicate the room condition plainly.

What is claimed is:

1. A key sensing system for indicating of a plurality of different room conditions of a hotel type room comprising:

a housing having an outer wall and an insertion hole for removably receiving, either a first or a second keyholder in said housing;

a plurality of spaced magnetic switches positioned in said housing, each of said switches being normally in a first state and operable individually in different combinations to a second state;

means, remote from said housing and electrically connected to said switches, for indicating each of said plurality of room conditions in accordance with the combination of switches in said first and second states, said means indicating a first room condition at a time when said switches are all in said first state;

a first keyholder having a front and back surface, said first keyholder being dimensioned to fit through said insertion hole in a first orientation with said front surface facing said outer wall of the housing, and a second orientation with said back surface facing said outer wall of the housing, said first keyholder including magnet means, positioned between said front and back surfaces to operate a first selected combination of said plurality of switches to said second state at times when said first keyholder is inserted in said insertion hole in either one of said first and second orientations, for indicating a second room condition at said indicating means;

a second keyholder having a front surface and a back surface, said second keyholder being dimensioned to fit through said insertion hole in a first orientation with said front surface facing said outer wall of the housing, and in a second orientation with said back surface facing said outer wall of the housing, said second keyholder including magnet means, positioned between said front and back surfaces to operate a second selected combination of said plurality of switches to said second state at times when said second keyholder is inserted in said insertion hole in said first orientation, and to operate a third selected combination of said plurality of switches to said second state at times when said second keyholder is inserted in said insertion hole in said second orientation, for indicating a third and fourth room condition, respectively, at said indicating means.

2. The key sensing system of claim 1, wherein said first room condition is indicative of non-occupancy of said hotel type room.

3. The key sensing system of claim 1 wherein said magnetic switches comprise reed switches.

4. The key sensing system of claim 1, wherein said magnetic material is comprised of ferro-magnetic material.

* * * * *